United States Patent
Iida et al.

(10) Patent No.: US 11,731,664 B2
(45) Date of Patent: Aug. 22, 2023

(54) VEHICLE ELECTRONIC CONTROL DEVICE, VEHICLE ELECTRONIC CONTROL METHOD, AND NON-TRANSITORY STORAGE MEDIUM

(71) Applicant: TOYOTA JIDOSHA KABUSHIKI KAISHA, Toyota (JP)

(72) Inventors: Tomoaki Iida, Okazaki (JP); Hideaki Ishihara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 164 days.

(21) Appl. No.: 17/499,064

(22) Filed: Oct. 12, 2021

(65) Prior Publication Data

US 2022/0204044 A1    Jun. 30, 2022

(30) Foreign Application Priority Data

Dec. 28, 2020    (JP) .................................. 2020-218660

(51) Int. Cl.
*B60W 60/00* (2020.01)
*B60R 16/033* (2006.01)

(52) U.S. Cl.
CPC ....... *B60W 60/0053* (2020.02); *B60R 16/033* (2013.01); *B60W 60/0057* (2020.02);
(Continued)

(58) Field of Classification Search
CPC ........ B60R 16/033; B60W 2040/0881; B60W 2050/007; B60W 2050/0006; B60W 2510/244; B60W 2540/227; B60W 2556/00; B60W 2520/04; B60W 2520/10; B60W 2540/223; B60W 2540/225; B60W 2540/229; B60W 2720/10; B60W 2720/12; B60W 2720/106; B60W 30/181;
(Continued)

(56) References Cited

U.S. PATENT DOCUMENTS

| | | | | |
|---|---|---|---|---|
| 2019/0126911 A1* | 5/2019 | Nienhueser | ......... | B60W 30/162 |
| 2019/0225237 A1* | 7/2019 | Ishikawa | ............. | B60W 50/082 |
| 2022/0332331 A1* | 10/2022 | Ming | ................ | B60W 50/023 |

FOREIGN PATENT DOCUMENTS

| | | |
|---|---|---|
| JP | 2003-015743 A | 1/2003 |
| JP | 2015-182526 A | 10/2015 |

(Continued)

*Primary Examiner* — Aniss Chad
*Assistant Examiner* — Richard J Schuler
(74) *Attorney, Agent, or Firm* — Dinsmore & Shohl LLP

(57) ABSTRACT

A vehicle electronic control device includes a detection device configured to detect a state of an occupant, a first control device, and a second control device. The second control device is configured to refer to a database defining a relationship between the state of the occupant and a first time and to autonomously drive the vehicle at speeds equal to or lower than the maximum allowable speed from a switching time that is the time at which the first control device becomes unable to control the vehicle. The database is set in such a manner that the maximum allowable speed corresponding to a second state of the occupant is lower than the maximum allowable speed corresponding to a first state of the occupant when the first time corresponding to the second state is longer than the first time corresponding to the first state.

4 Claims, 5 Drawing Sheets

(52) U.S. Cl.
CPC ............... *B60W 2510/244* (2013.01); *B60W 2540/227* (2020.02); *B60W 2556/00* (2020.02); *B60W 2720/10* (2013.01); *B60W 2720/12* (2013.01)

(58) Field of Classification Search
CPC .... B60W 40/08; B60W 40/105; B60W 50/02; B60W 50/029; B60W 50/023; B60W 60/0018; B60W 60/001; B60W 60/0051; B60W 60/0053; B60W 60/0057; G05D 2201/0213; G05D 1/0061; G06F 11/2038; G06F 11/2048

See application file for complete search history.

(56) References Cited

FOREIGN PATENT DOCUMENTS

| | | |
|---|---|---|
| JP | 2017-182249 A | 10/2017 |
| JP | 2019-127143 A | 8/2019 |

* cited by examiner

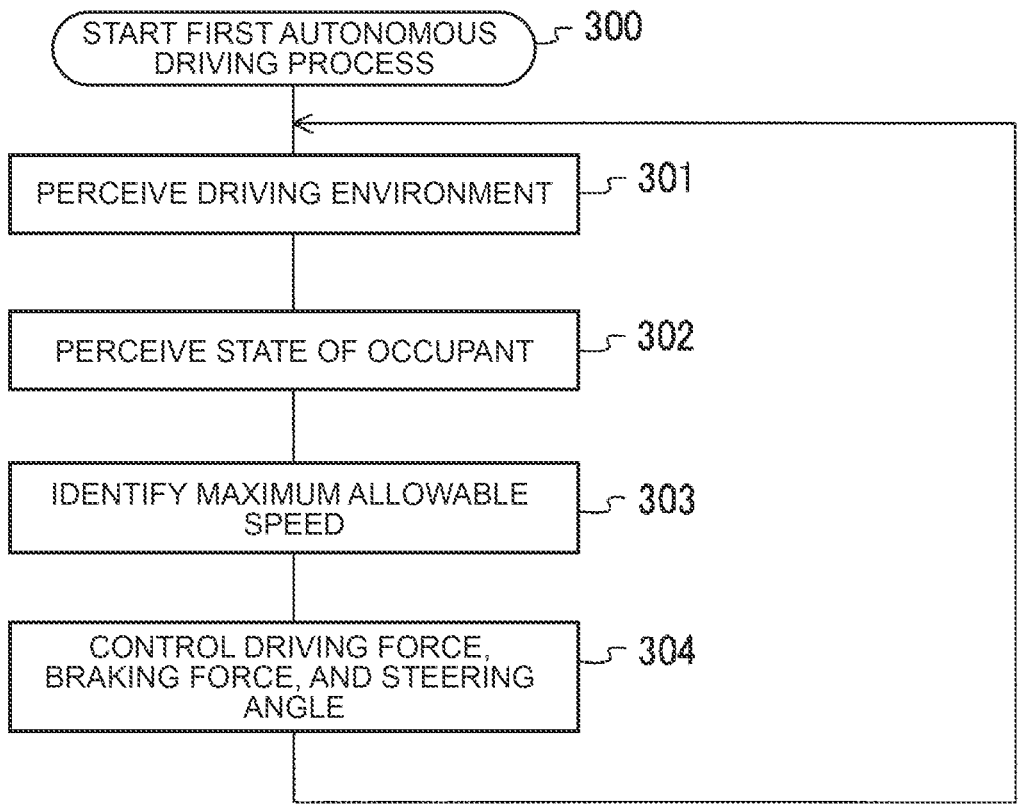

FIG. 6
| | STATE OF OCCUPANT | TIME T1 | TIME T2 |
|---|---|---|---|
| (a) | TOUCHING STEERING WHEEL | 2 SEC | 58 SEC |
| (b) | WATCHING TV WITH NO HANDS ON STEERING WHEEL | 5 SEC | 55 SEC |
| (c) | HOLDING CELL PHONE WITH NO HANDS ON STEERING WHEEL | 15 SEC | 45 SEC |
| (d) | BACKREST RECLINED WITH NO HANDS ON STEERING WHEEL | 30 SEC | 30 SEC |
| (e) | ASLEEP | – | – |
FIG. 7A
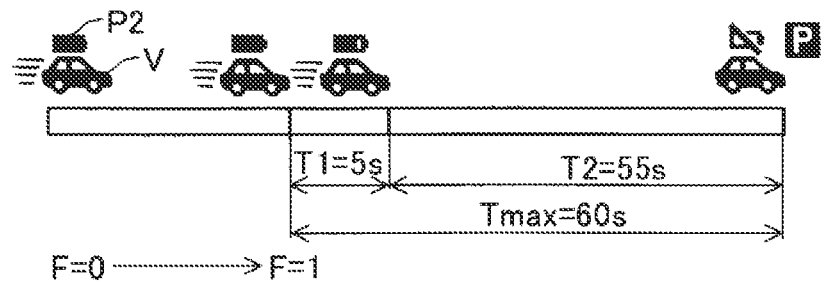
FIG. 7B
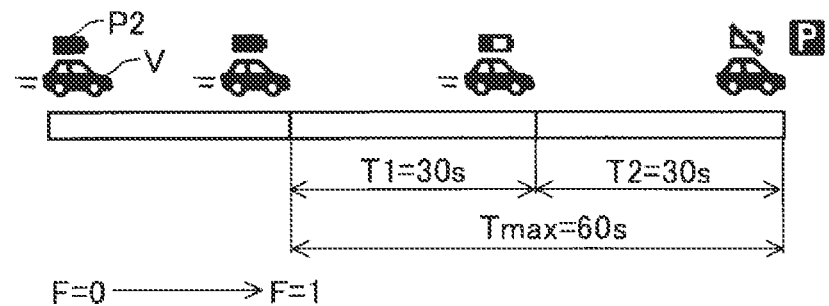

VEHICLE ELECTRONIC CONTROL DEVICE, VEHICLE ELECTRONIC CONTROL METHOD, AND NON-TRANSITORY STORAGE MEDIUM

CROSS-REFERENCE TO RELATED APPLICATION

This application claims priority to Japanese Patent Application No. 2020-218660 filed on Dec. 28, 2020, incorporated herein by reference in its entirety.

BACKGROUND

1. Technical Field

The present disclosure relates to vehicle electronic control devices, vehicle electronic control methods, and non-temporary storage media for autonomously driving a vehicle.

2. Description of Related Art

Vehicle electronic control devices for autonomously driving a vehicle are known. One of such control devices includes a first controller and a second controller. In a normal state (when the first controller is normal), the first controller controls an engine, brakes, steering, etc. to autonomously drive the vehicle. When an abnormality occurs in a part of the first controller, the second controller controls the engine, brakes, steering, etc. to autonomously drive the vehicle. The first controller and the second controller are powered by a battery (see Japanese Unexamined Patent Application Publication No. 2003-15743 (JP 2003-15743 A).

SUMMARY

It is considered to configure a vehicle electronic control device so that when an abnormality occurs in a part of the first controller, the second controller controls the engine, brakes, steering, etc. to slow down and stop the vehicle at such deceleration that neither makes an occupant feel uneasy nor requires the following vehicle to suddenly slow down. In this case, the battery needs to have a sufficient amount of electric power to keep the second controller running until the vehicle stops.

For example, when the vehicle speed is relatively low at the time the second controller starts controlling the vehicle, the time required to stop the vehicle is relatively short. Accordingly, the second controller consumes a relatively small amount of electric power during the period from the time the second controller starts slowing down the vehicle until the vehicle stops (hereinafter referred to as the "deceleration period"). On the other hand, when the vehicle speed is relatively high at the time the second controller starts controlling the vehicle, the deceleration period is relatively long. The second controller therefore consumes a relatively large amount of electric power during the deceleration period. As described above, power consumption of the second controller during the deceleration period varies depending on the vehicle speed at the time the second controller starts controlling the vehicle. It is therefore necessary to determine the capacity of the battery in view of the maximum power consumption of the second controller. Accordingly, the vehicle needs to be equipped with a large-capacity battery. This increases the cost of the battery and thus increases the parts cost of the vehicle.

The present disclosure provides a vehicle electronic control device, vehicle electronic control method, and non-temporary storage medium that can reduce the parts cost of a vehicle.

A vehicle electronic control device according to a first aspect of the present disclosure includes: a detection device configured to detect a state of an occupant sitting in a seat where the occupant operates a driving operator of a vehicle; a first control device; and a second control device. The first control device is configured to be powered by a first battery mounted on the vehicle. The first control device is configured to refer to a database that defines in advance a relationship between the state of the occupant and a maximum allowable speed of the vehicle. The first control device is configured to identify the maximum allowable speed of the vehicle that corresponds to the state of the occupant. The state of the occupant is detected by the detection device. The first control device is configured to autonomously drive the vehicle at speeds equal to or lower than the identified maximum allowable speed. The second control device is configured to be powered by a second battery mounted on the vehicle. The second control device is configured to refer to a database that defines in advance a relationship between the state of the occupant and a first time. The first time is a time period required from when information for causing the occupant to start manual driving by operating the driving operator is presented until the occupant starts the manual driving. The database that defines in advance the relationship between the state of the occupant and the first time is set in such a manner that the maximum allowable speed corresponding to a second state of the occupant is lower than the maximum allowable speed corresponding to a first state of the occupant when the first time corresponding to the second state is longer than the first time corresponding to the first state. The second control device is configured to identify the first time corresponding to the detected state of the occupant. The second control device is configured to start presenting the information to the occupant of the vehicle at a switching time that is a time at which the first control device becomes unable to control the vehicle; The second control device is configured to autonomously drive the vehicle from the switching time at speeds equal to or lower than the maximum allowable speed at the switching time. The maximum allowable speed is such a speed that the vehicle is able to be stopped within a second time by slowing down the vehicle at deceleration whose absolute value is smaller than a predetermined value. The second time is battery duration minus the first time. The battery duration is a time period from when the second battery is in a fully charged state until the second battery is no longer able to continue to operate the second control device without being charged. The second control device is configured to stop the vehicle when the occupant does not start the manual driving during a period from the switching time until the identified first time elapses.

For example, the battery duration is a time period from the time at which the first battery becomes unable to supply electric power until the second battery can no longer supply electric power to the second control device in the case where the second battery continues to supply electric power to the second control device with maximum power consumption (value calculated in view of all driving conditions) of the second control device.

In order to apply the vehicle electronic control device according to the present disclosure to a vehicle, as large a space as possible is first secured in the vehicle and an energy storage device that can be housed in this space is used as the second battery. The maximum allowable speed for each state of the occupant may then be defined according to the capacity of the second battery. For example, when the mounting space for the second battery in the vehicle is relatively small and the battery duration of the second battery is relatively short, relatively small values are assigned to the maximum allowable speed for each state of the occupant. As described above, when the first control device is unable to control the vehicle, the second control device can be powered by the small-capacity second battery to slow down and stop the vehicle. Therefore, according to the present disclosure, the second battery with a small capacity can be used, and the parts cost of the vehicle can be reduced. In other words, the vehicle electronic control device according to the present disclosure is also applicable to a vehicle (small vehicle) on which only a battery with a relatively small capacity can be mounted. That is, the vehicle electronic control device according to the present disclosure is highly versatile.

In the vehicle electronic control device according to the first aspect of the present disclosure, the detection device may include a first detection device and a second detection device. The first control device may be configured to identify the maximum allowable speed of the vehicle that corresponds to the state of the occupant. The state of the occupant may be detected by the first detection device. The second control device may be configured to identify the first time corresponding to the state of the occupant detected by the second detection device.

With this configuration, even if an abnormality occurs in the first detection device, the second detection device can detect the state of the occupant and the second detection device can therefore autonomously drive the vehicle.

The present disclosure also relates to a method that is used in the vehicle electronic control device and a non-transitory storage medium storing a computer program that is executed by the vehicle electronic control device.

A vehicle electronic control method according to a second aspect of the present disclosure is applied to a vehicle electronic control device including: a detection device; a first control device configured to be powered by a first battery mounted on a vehicle; and a second control device configured to be powered by a second battery mounted on the vehicle. The vehicle electronic control method includes detecting by the detection device a state of an occupant sitting in a seat where the occupant operates a driving operator of the vehicle. The vehicle electronic control method includes referring to a database that defines in advance a relationship between the state of the occupant and a maximum allowable speed of the vehicle by the first control device. The vehicle electronic control method includes identifying by the first control device the maximum allowable speed of the vehicle that corresponds to the state of the occupant. The state of the occupant is detected by the detection device. The vehicle electronic control method includes autonomously driving the vehicle at speeds equal to or lower than the identified maximum allowable speed by the first control device. The vehicle electronic control method includes referring to a database that defines in advance a relationship between the state of the occupant and a first time by the second control device. The first time is a time period required from when information for causing the occupant to start manual driving by operating the driving operator is presented until the occupant starts the manual driving. The database that defines in advance the relationship between the state of the occupant and the first time is set in such a manner that the maximum allowable speed corresponding to a second state of the occupant is lower than the maximum allowable speed corresponding to a first state of the occupant when the first time corresponding to the second state is longer than the first time corresponding to the first state. The vehicle electronic control method includes identifying the first time corresponding to the detected state of the occupant by the second control device. The vehicle electronic control method includes starting presenting the information to the occupant of the vehicle at a switching time that is a time at which the first control device becomes unable to control the vehicle by the second control device. The vehicle electronic control method includes autonomously driving the vehicle from the switching time at speeds equal to or lower than the maximum allowable speed at the switching time by the second control device. The maximum allowable speed is such a speed that the vehicle is able to be stopped within a second time by slowing down the vehicle at deceleration whose absolute value is smaller than a predetermined value. The second time is battery duration minus the first time. The battery duration is a time period from when the second battery is in a fully charged state until the second battery is no longer able to continue to operate the second control device without being charged. The vehicle electronic control method includes stopping the vehicle by the second control device when the occupant does not start the manual driving during a period from the switching time until the identified first time elapses.

A non-transitory storage medium according to a third aspect of the present disclosure stores instructions that are executable by one or more processors and that cause the one or more processors to perform functions of a vehicle electronic control device. The vehicle electronic control device includes: a detection device; a first control device configured to be powered by a first battery mounted on a vehicle; and a second control device configured to be powered by a second battery mounted on the vehicle. The functions include detecting by the detection device a state of an occupant sitting in a seat where the occupant operates a driving operator of the vehicle. The functions include referring to a database that defines in advance a relationship between the state of the occupant and a maximum allowable speed of the vehicle by the first control device. The functions include identifying by the first control device the maximum allowable speed of the vehicle that corresponds to the state of the occupant. The state of the occupant is detected by the detection device. The functions include autonomously driving the vehicle at speeds equal to or lower than the identified maximum allowable speed by the first control device. The functions include referring to a database that defines in advance a relationship between the state of the occupant and a first time by the second control device. The first time is a time period required from when information for causing the occupant to start manual driving by operating the driving operator is presented until the occupant starts the manual driving. The database that defines in advance a relationship between the state of the occupant and a first time is set in such a manner that the maximum allowable speed corresponding to a second state of the occupant is lower than the maximum allowable speed corresponding to a first state of the occupant when the first time corresponding to the second state is longer than the first time corresponding to the first state. The functions include identifying the first time corresponding to the detected state of the occupant by the second control device. The functions include starting presenting the information to the occupant of the vehicle at a switching time that is a time at which the first control device becomes unable to control the vehicle by the second control device.

The functions include autonomously driving the vehicle from the switching time at speeds equal to or lower than the maximum allowable speed at the switching time by the second control device. The maximum allowable speed is such a speed that the vehicle is able to be stopped within a second time by slowing down the vehicle at deceleration whose absolute value is smaller than a predetermined value. The second time is battery duration minus the first time. The battery duration is a time period from when the second battery is in a fully charged state until the second battery is no longer able to continue to operate the second control device without being charged. The functions include stopping the vehicle by the second control device when the occupant does not start the manual driving during a period from the switching time until the identified first time elapses.

Other objects, other features, and accompanying advantages of the present disclosure are readily understood from the following description of an embodiment of the present disclosure that is given with reference to the drawings.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a flowchart of a first autonomous driving program;

FIG. 4 is a conceptual diagram of a first database;

FIG. 6 is a conceptual diagram of a second database;

FIG. 7A is a conceptual diagram illustrating a process in which a second central processing unit (CPU) takes over control of a vehicle from a first CPU to stop the vehicle; and FIG. 7B is a conceptual diagram illustrating a process in which the second CPU takes over control of the vehicle from the first CPU to stop the vehicle.

DETAILED DESCRIPTION OF EMBODIMENTS

Figure 1:
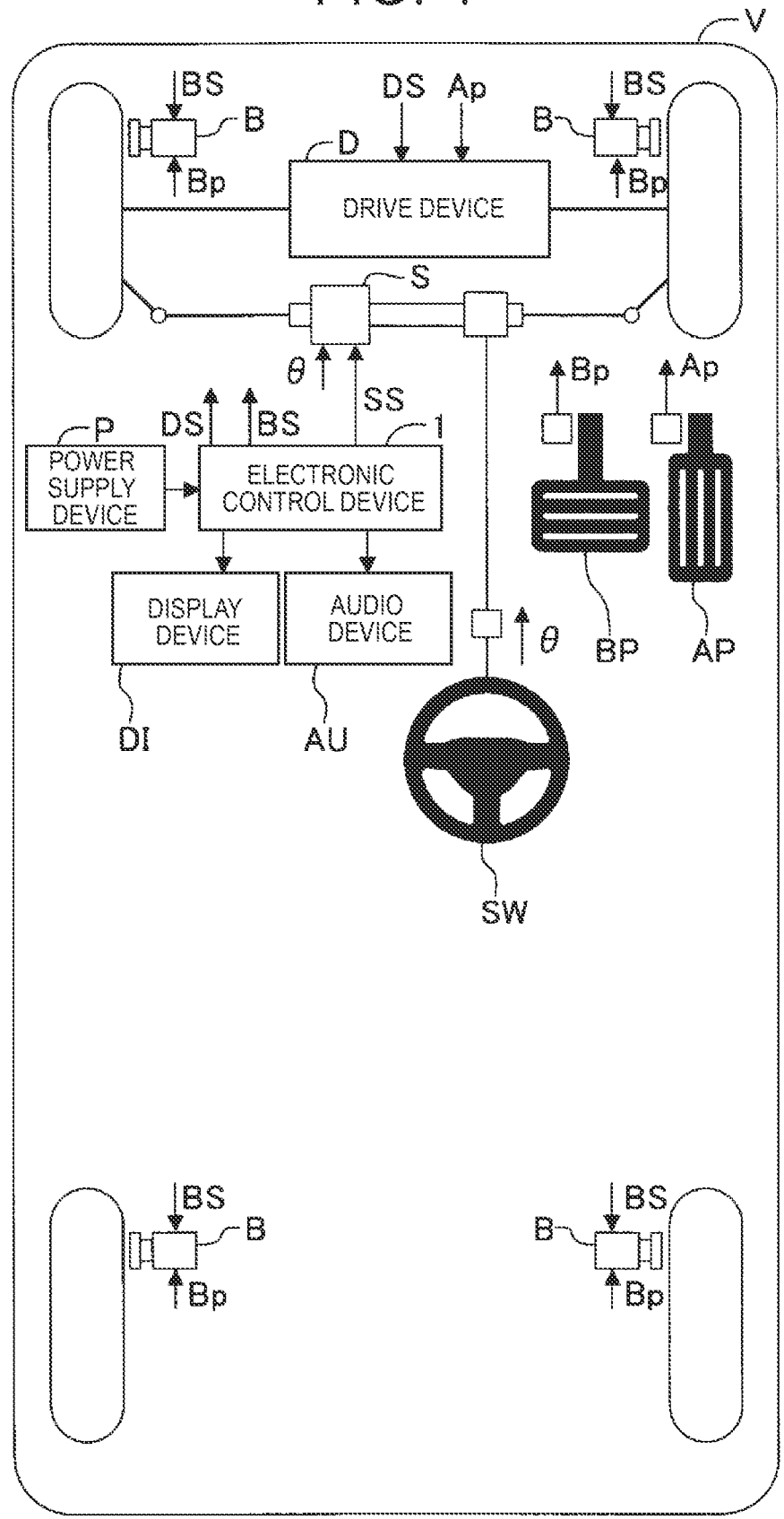
FIG. 1 is a block diagram of a vehicle to which a vehicle electronic control device according to an embodiment of the present disclosure is applied.

As shown in FIG. 1, a vehicle electronic control device (autonomous driving control device) 1 according to an embodiment of the present disclosure is applied to a vehicle V. The vehicle V includes a drive device D (engine, transmission, etc.), a braking device B, and a steering system S. The vehicle V further includes an accelerator pedal AP, a brake pedal BP, and a steering wheel SW. The accelerator pedal AP, the brake pedal BP, and the steering wheel SW are driving operators for manually controlling the drive device D, the braking device B, and the steering system S, respectively. The vehicle V further includes a display device DI for displaying a video or image and an audio device AU for generating audio.

The vehicle V is operated in either a manual drive mode or an autonomous drive mode. The manual drive mode is an operation mode in which an occupant (driver) of the vehicle V operates the accelerator pedal AP, the brake pedal BP, and the steering wheel SW to drive the vehicle V according to their operation manners. The accelerator pedal AP, the brake pedal BP, and the steering wheel SW are connected to the drive device D, the braking device B, and the steering system S, respectively, via a well-known hydraulic system. The drive device D generates a driving force according to the operation amount (depression depth) Ap of the accelerator pedal AP. The braking device B generates a braking force according to the operation amount (depression depth) Bp of the brake pedal BP. The steering system S changes the steering angle according to the operation amount (steering angle) $\theta$ of the steering wheel SW. A device (first controller 10 that will be described later in detail) forming a part of the vehicle electronic control device 1 may operate when the vehicle electronic control device 1 can operate normally in the manual drive mode. The first controller 10 may be configured to assist the driver in performing driving operations (for example, to reduce the operation forces of the driving operators).

The autonomous drive mode is an operation mode in which the vehicle electronic control device 1 controls the drive device D, the braking device B, and the steering system S to autonomously drive the vehicle V toward a destination designated by the occupant. That is, the drive device D generates a driving force according to a control signal DS. The braking device B generates a braking force according to a control signal BS. The steering system S changes the steering angle according to a control signal SS. The occupant therefore does not need to operate the accelerator pedal AP, the brake pedal BP, the steering wheel SW, etc. in the autonomous drive mode. The occupant of the vehicle V can switch the operation mode from the manual drive mode to the autonomous drive mode by operating a mode selection operator (switch, touch panel, etc.), not shown. The occupant can also switch the operation mode from the autonomous drive mode to the manual drive mode by operating the mode selection operator.

Specifically, a main electronic control unit (ECU), not shown, monitors for an operation mode switching operation that is performed using the mode selection operator (an operation mode selection operation that is performed by the occupant). When the main ECU detects that the autonomous drive mode has been selected, the main ECU causes the vehicle electronic control device 1 to control the drive device D, the braking device B, and the steering system S to autonomously drive the vehicle V. When the main ECU detects that the manual drive mode has been selected, the main ECU causes the vehicle electronic control device 1 to stop controlling the drive device D, the braking device B, and the steering system S. In this case, the main ECU may cause the vehicle electronic control device 1 to perform control for assisting the driver in performing the driving operations. As will be described in detail later, when an abnormality (failure) occurs in the vehicle electronic control device 1, the main ECU disables the switching operation from the manual drive mode to the autonomous drive mode. When the operation mode is switched, the main ECU causes the audio device AU to generate predetermined audio and causes the display device DI to display a predetermined image.

Figure 2:
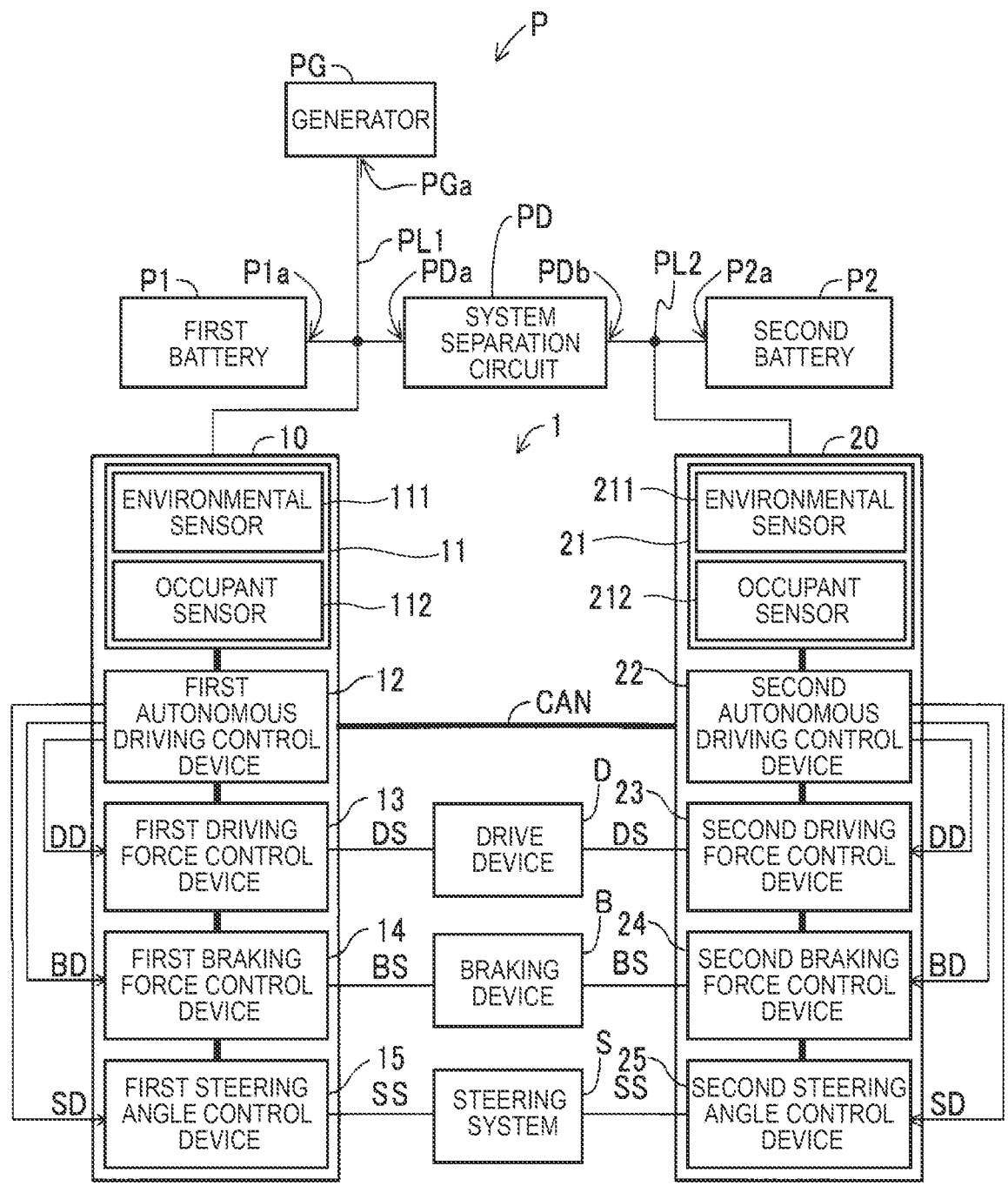
FIG. 2 is a block diagram of the vehicle electronic control device shown in FIG. 1.

The vehicle V further includes a power supply device P that supplies electric power to the vehicle electronic control device 1. As shown in FIG. 2, the power supply device P includes a generator PG, a first battery P1, a second battery P2, and a system separation circuit PD.

The generator PG is driven by the drive device D and outputs electric power. Output terminals PGa (positive terminal) and negative (reference potential) terminal) of the generator PG are connected to a power supply path PL1.

The first battery P1 includes a well-known lead-acid battery. The second battery P2 includes a well-known lithium-ion battery. The storage capacity of the second battery P2 is smaller than the storage capacity of the first battery P1. The second battery P2 is smaller than the first battery P1. The second battery P2 may include an energy storage device composed of a large-capacity capacitor (aluminum electrolytic capacitor, electric double-layer capacitor, etc.).

Terminals P1a (positive terminal and negative terminal) of the first battery P1 are connected to the power supply path PL1. Terminals P2a (positive terminal and negative terminal) of the second battery P2 are connected to a power supply path PL2.

The system separation circuit PD includes a well-known direct current-to-direct current (DC-to-DC) converter composed of a switching circuit, a transformer, etc. A terminal PDa of a circuit on the primary side (input side) of the transformer of the DC-to-DC converter that composes the system separation circuit PD is connected to the power supply path PL1. A terminal PDb of a circuit on the secondary side (output side) of the transformer of the system separation circuit PD is connected to the power supply path PL2. That is, the system separation circuit PD electromagnetically couples the power supply system (power supply path PL1) on the first battery P1 side and the power supply system (power supply path PL2) on the second battery P2 side. The system separation circuit PD electrically insulates the power supply system on the first battery P1 side and the power supply system on the second battery P2 side from each other. Accordingly, for example, even if the positive and negative electrodes of the first battery P1 are short-circuited, the second battery P2 is hardly affected by this failure of the first battery P1. Electric power can therefore be supplied to a device (second controller 20 that will be described later) connected to the power supply path PL2. The system separation circuit PD may include a device having the same function as the DC-to-DC converter, instead of the DC-to-DC converter. An example of the device having the same function as the DC-to-DC converter is a device composed of a relay, a diode, etc.

The electric power output from the generator PG is supplied to the first battery P1 to charge the first battery P1. The electric power output from the generator PG is also supplied to the second battery P2 via the system separation circuit PD to charge the second battery P2. When the generator PG is not outputting electric power, the electric power of the first battery P1 may be supplied to the second battery P2 via the system separation circuit PD to charge the second battery P2. The capacity of the second battery P2 is relatively small. Accordingly, the amount of electricity stored in the second battery P2 reaches its maximum value (fully charged state) in a relatively short time after the drive device D of the vehicle V is started and the generator PG starts operating.

The vehicle electronic control device 1 includes the first controller 10 and the second controller 20. The first controller 10 and the second controller 20 are connected to a communication bus CAN.

The first controller 10 includes a first sensor 11, a first autonomous driving control device 12, a first driving force control device 13, a first braking force control device 14, and a first steering angle control device 15. The first sensor 11, the first autonomous driving control device 12, the first driving force control device 13, the first braking force control device 14, and the first steering angle control device 15 are connected to the communication bus CAN. Power supply terminals of the devices that composes the first controller 10 are connected to the power supply path PL1. That is, the electric power of the first battery P1 is supplied to the first sensor 11, the first autonomous driving control device 12, the first driving force control device 13, the first braking force control device 14, and the first steering angle control device 15 via the power supply path PL1.

The first sensor 11 includes an environmental sensor 111. The environmental sensor 111 acquires data for identifying (perceiving) the driving environment of the vehicle V. The environmental sensor 111 includes an optical sensor (digital camera), a radar, a navigation system, a vehicle speed sensor, etc. The optical sensor captures an image of the road ahead of the vehicle V. The radar detects the distance to an obstacle existing around the vehicle V. The navigation system detects the current position (latitude and longitude) of the vehicle V. The vehicle speed sensor detects the speed of the vehicle V. Data representing the detection results of each device included in the environmental sensor 111 is supplied to the first autonomous driving control device 12 via the communication bus CAN.

The first sensor 11 further includes an occupant sensor 112. The occupant sensor 112 acquires data for identifying (perceiving) the state (posture, behavior, etc.) of the occupant of the vehicle V. As used herein, the occupant refers to an occupant sitting in a seat where the accelerator pedal AP, the brake pedal BP, and the steering wheel SW are disposed. The occupant sensor 112 includes an optical sensor (digital camera), a seat sensor, a touch sensor, etc. The optical sensor captures an image of the occupant. The seat sensor detects the angle of the backrest of the seat. The touch sensor detects whether the occupant is touching the steering wheel SW. The occupant sensor 112 may further include sensors that detect the operation amount Ap of the accelerator pedal AP, the operation amount Bp of the brake pedal BP, and the operation amount θ (steering angle) of the steering wheel SW. Data representing the detection results of each device included in the occupant sensor 112 is supplied to the first autonomous driving control device 12 via the communication bus CAN.

The first autonomous driving control device 12 includes a microcomputer composed of an arithmetic unit (hereinafter referred to as the "first CPU"), a storage device, a timer, etc.

The first CPU has a self-diagnosis function to detect whether an abnormality has occurred in a first system that is composed of the first battery P1 and the first controller 10. When the drive device D of the vehicle V is started, the first CPU initializes an error flag F provided therein to "0" indicating that the first system is normal. Next, the first CPU starts monitoring the output voltage of the first battery P1. As long as the output voltage of the first battery P1 is within a predetermined voltage range, the first CPU will not update the error flag F. When the output voltage of the first battery P1 goes out of the predetermined voltage range, the first CPU updates the error flag F to "1" indicating that an abnormality has occurred in the first system.

The first CPU also periodically sends a response request signal to the first sensor 11, the first driving force control device 13, the first braking force control device 14, and the first steering angle control device 15. The first sensor 11, the first driving force control device 13, the first braking force control device 14, and the first steering angle control device 15 are configured to send a predetermined response signal to the first CPU within a predetermined time after receiving the response request signal. The first CPU will not update the error flag F when the first CPU receives the response signals from the first sensor 11, the first driving force control device 13, the first braking force control device 14, and the first steering angle control device 15 within the predetermined time after the first CPU sent the response request signal. The first CPU updates the error flag F to "1" when the first CPU fails to receive the response signals from any one or more of the first sensor 11, the first driving force control device 13, the first braking force control device 14, and the first steering angle control device 15 within the predetermined time after the first CPU sent the response request signal. The main ECU periodically reads the error flag F. When the error flag F is "0," the main ECU allows switching of the operation mode. When the error flag F is "1," the main ECU disables the switching operation from the manual drive mode to the autonomous drive mode by the occupant and will not change the operation mode.

When the main ECU detects that the autonomous drive mode has been selected by the occupant (the operation mode has been switched from the manual drive mode to the autonomous drive mode) with the error flag F being "0," the main ECU causes the first CPU to execute a first autonomous driving program shown in FIG. 3.

The first CPU starts a first autonomous driving process in step 300. The first CPU then acquires data representing a captured image of the road ahead of the vehicle V, the distance to an obstacle, the current position of the vehicle V, the speed of the vehicle V, etc. from the environmental sensor 111. In step 301, the first CPU identifies (perceives) the driving environment of the vehicle V (degree to which the traveling lane is curved, position of the vehicle V in the lane, following distance, presence or absence of obstacles, etc.) based on the data. Thereafter, the first CPU acquires data representing a captured image of the occupant, the angle of the backrest of the seat, whether the occupant is touching the steering wheel SW, etc. from the occupant sensor 112. In step 302, the first CPU identifies (perceives) the state of the occupant (posture, behavior (e.g., change in hand position, change in line of sight), etc.) based on the data.

The storage device of the first autonomous driving control device 12 stores a database D1 representing the relationship between the state of the occupant and the maximum allowable speed Smax for autonomous driving shown in FIG. 4 in the form of a lookup table (map). As will be described in detail later, when the first controller 10 becomes unable to control the vehicle V, the second controller 20 takes over the control of the vehicle V. As soon as the second controller 20 starts controlling the vehicle V, information for causing the occupant to start operating the driving operators is presented. It takes a certain amount of time from when this information is presented until the occupant actually starts the driving operation of the vehicle V. Hereinafter, this time is also simply referred to as the "manual driving start time." As shown in FIG. 4, a relatively large value has been assigned to the maximum allowable speed Smax corresponding to the state of the occupant in which "the manual driving start time is relatively short" (see, e.g., (a) in FIG. 4). A relatively small value has been assigned to the maximum allowable speed Smax corresponding to the state of the occupant in which "the manual driving start time is relatively long" (see, e.g., (d) in FIG. 4). The manual driving start time is statistically obtained. The values assigned to the maximum allowable speed Smax corresponding to each state in the database D1 are not limited to the example of FIG. 4, and other values may be assigned to the maximum allowable speed Smax. The "state of occupant" in the database D1 is not limited to the states shown in FIG. 4 and may include other states.

Referring back to FIG. 3, in step 303, the first CPU refers to the database D1 and identifies (reads) the maximum allowable speed Smax corresponding to the perceived state of the occupant.

The first CPU then controls the drive device D, the braking device B, and the steering system S in step 304. Specifically, the first CPU determines the autonomous driving manner of the vehicle V (direction in which the vehicle V should travel (desired direction) and speed at which the vehicle V should travel (desired speed)) based on the identified driving environment and the identified maximum allowable speed Smax. At this time, the first CPU determines the desired speed so that the desired speed does not exceed the maximum allowable speed Smax. The first CPU controls the first driving force control device 13, the first braking force control device 14, and the first steering angle control device 15 so that the vehicle V travels in the determined manner. The first driving force control device 13, the first braking force control device 14, and the first steering angle control device 15 thus controlled by the first CPU control the drive device D, the braking device B, and the steering system S, respectively. That is, as shown in FIG. 3, the first CPU generates desired value data representing a desired value DD of the driving force, a desired value BD of the braking force, and a desired value SD of the steering angle, respectively, according to the perception results. The first CPU provides the desired value data to the first driving force control device 13, the first braking force control device 14, and the first steering angle control device 15. The routine then returns to step 301.

The first driving force control device 13 generates a control signal DS based on the desired value DD of the driving force, and supplies the control signal DS to the drive device D. That is, the first driving force control device 13 controls the drive device D so that the driving force generated by the drive device D matches the desired value DD.

The first braking force control device 14 generates a control signal BS based on the desired value BD of the braking force, and supplies the control signal BS to the braking device B. That is, the first braking force control device 14 controls the braking device B so that the braking force generated by the braking device B matches the desired value BD.

The first steering angle control device 15 generates a control signal SS based on the desired value SD of the steering angle, and supplies the control signal SS to the steering system S. That is, the first steering angle control device 15 controls the steering system S so that the steering angle matches the desired value SD.

When the first CPU perceives that the occupant is asleep in step 302, the first CPU immediately starts a "process of slowing down and stopping the vehicle V."

As will be described in detail later, when it is determined that an abnormality has occurred in the first system and that the first CPU is unable to control the vehicle V (when the error flag F is "1"), the second controller 20 controls the vehicle V in place of the first controller 10. The second controller 20 includes a second sensor 21, a second autonomous driving control device 22, a second driving force control device 23, a second braking force control device 24, and a second steering angle control device 25. These devices are similar to the first sensor 11, the first autonomous driving control device 12, the first driving force control device 13, the first braking force control device 14, and the first steering angle control device 15 of the first controller 10, respectively. The second sensor 21 includes an environmental sensor 211 and an occupant sensor 212. The second sensor 21, the second autonomous driving control device 22, the second driving force control device 23, the second braking force control device 24, and the second steering angle control device 25 are connected to the communication bus CAN. Power supply terminals of the devices that composes the second controller 20 are connected to the power supply path PL2. That is, the electric power of the second battery P2 is supplied to the second sensor 21, the second autonomous driving control device 22, the second driving force control device 23, the second braking force control device 24, and the second steering angle control device 25 via the power supply path PL2.

In the autonomous drive mode, an arithmetic unit (hereinafter referred to as the "second CPU") of the second autonomous driving control device 22 periodically reads the error flag F of the first CPU via the communication bus CAN. When the read error flag F is "0," the second CPU stops the second driving force control device 23, the second braking force control device 24, and the second steering angle control device 25.

Figure 5:
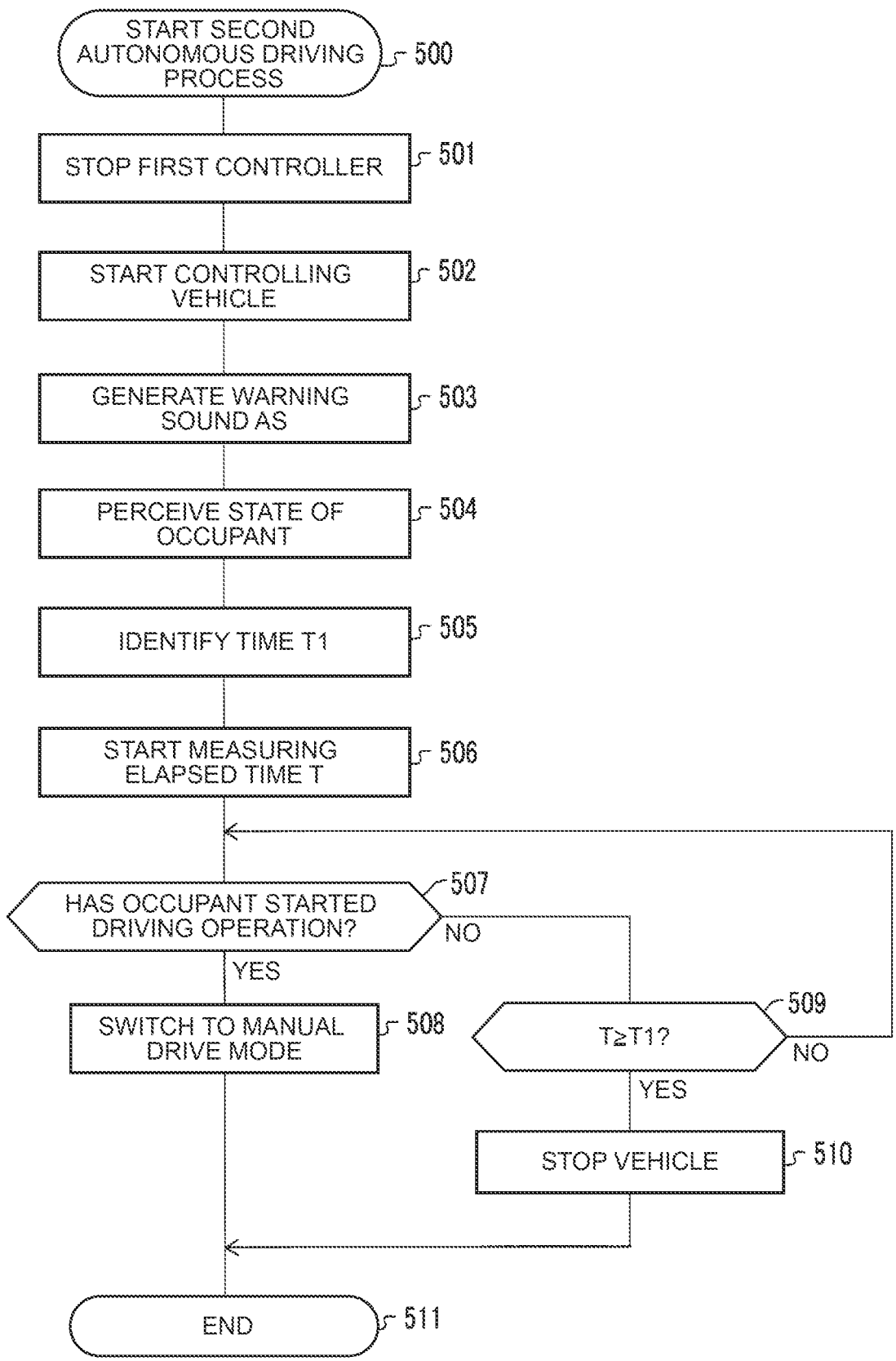
FIG. 5 is a flowchart of a second autonomous driving program.

When the read error flag F is "1" or the second CPU fails to read the error flag F (when the first CPU does not respond), the second CPU executes a second autonomous driving program shown in FIG. 5. The second CPU starts a second autonomous driving process in step 500. In step 501, the second CPU sends a signal for suspending the first driving force control device 13, the first braking force control device 14, and the first steering angle control device 15 to stop these devices. Next, in step 502, the second CPU starts controlling the vehicle V in place of the first CPU. That is, the second CPU controls the second driving force control device 23, the second braking force control device 24, and the second steering angle control device 25 based on the data acquired from the second sensor 21 to autonomously drive the vehicle V. The allowable maximum speed Smax at this time is the speed at the time the second CPU takes over the control of the vehicle V from the first CPU.

In step 503, the second CPU causes the audio device AU to generate a warning sound AS in order to cause the occupant to operate the driving operators to start manual driving. This warning sound may be a message saying "Please start manual driving." At this time, the second CPU may cause the display device DI to display a message "Please start manual driving." That is, the second CPU warns the occupant using either visual or auditory outputs.

It takes a certain amount of time from when the warning sound AS is generated until the occupant is ready to perform the driving operation of the vehicle V. This time depends on the state of the occupant at the time the warning sound AS was generated. Therefore, the second CPU waits for the occupant to start the driving operation while autonomously driving the vehicle V. In the case where the occupant does not start the driving operation even after a predetermined first time T1 according to the state of the occupant at the time the warning sound AS was generated elapses, the second CPU slows down and stops the vehicle V. When the second CPU perceives that the occupant is asleep, the second CPU immediately starts the "process of slowing down and stopping the vehicle V."

Specifically, in step 504, the second CPU acquires data representing the state of the occupant from an occupant sensor 212, and perceives the state of the occupant based on the data.

A storage device of the second autonomous driving control device 22 stores a database D2 representing the relationship between the state of the occupant and the first time T1 shown in FIG. 6 in the form of a lookup table (map). Statistically obtained standard values (e.g., average values) have been assigned to the first time T1 corresponding to each state of the occupant. In step 505, the second CPU refers to the database D2 and identifies (reads) the first time T1 corresponding to the perceived state of the occupant. The values assigned to the first time T1 corresponding to each state in the database D2 are not limited to the example of FIG. 6, and other values may be assigned to the first time T1. The "state of occupant" in the database D2 is not limited to the states shown in FIG. 6 and may include other states.

Thereafter, in step 506, the second CPU starts measuring the elapsed time T from the present time using a timer.

In step 507, the second CPU acquires data representing the state of the occupant from the occupant sensor 212, and determines whether the occupant has started the driving operation based on the data. When the occupant has started the driving operation (for example, when the occupant has started operating the steering wheel SW (step 507: Yes)), the second CPU causes the main ECU to switch the operation mode of the vehicle V to the manual drive mode in step 508, and ends the second autonomous driving process in step 511. That is, in this case, even when the occupant does not operate the mode selection operator, switching of the operation mode to the manual drive mode is triggered by the occupant starting the driving operation. The second driving force control device 23, the second braking force control device 24, and the second steering angle control device 25 are then stopped.

When the occupant has not started the driving operation in step 507 (for example, when the occupant is not touching the steering wheel SW (step 507: No)), the second CPU determines in step 509 whether the elapsed time T has reached the identified first time T1. When the elapsed time T has not yet reached the first time T1 (step 509: No), the routine returns to step 507. When the elapsed time T has reached the identified first time T1 (step 509: Yes), the second CPU stops the vehicle V within a predetermined second time T2, which will be described later, in step 510. For example, the second CPU moves the vehicle V from a passing lane to a driving lane while slowing down the vehicle V at constant or variable deceleration (negative acceleration). The second CPU then moves the vehicle V to the shoulder of the road and stops the vehicle V on the shoulder of the road. The second CPU ends the second autonomous driving process in step 511. The deceleration in this case is set in advance to such a value that neither makes the occupant feel uneasy nor requires the following vehicle to suddenly slow down.

The second time T2 is the battery duration Tmax (e.g., "60 seconds," see FIGS. 7A and 7B) minus the first time T1 (T2=Tmax−T1). The battery duration Tmax is the maximum time until the second battery P2 that is fully charged and that is not charged any more can no longer continue to operate the second controller 20. That is, the second time T2 is the time for which the second controller 20 can be operated with the maximum capacity of the second battery P2 minus the amount of power consumed by the second controller 20 within the first time T1. Accordingly, when the first time T1 is relatively short (e.g., "5 seconds"), the time T2 available to stop the vehicle V is relatively long (e.g., "55 seconds" (see FIG. 7A)). In this case, a relatively large value has therefore been assigned to the allowable maximum speed Smax (see (a) of FIG. 4). On the other hand, when the first time T1 is relatively long (e.g., "30 seconds"), the time T2 available to stop the vehicle V is relatively short (e.g., "30 seconds" (see FIG. 7B)). A relatively small value has therefore been assigned to the maximum allowable speed Smax so that the vehicle V can be stopped within such a relatively short time T2 without making the occupant feel uneasy and without requiring the following vehicle to suddenly slow down (see (d) in FIG. 4).

As described above, the speed at which the first CPU autonomously drives the vehicle V is limited to values equal to or lower than the maximum allowable speed Smax according to the state of the occupant. The maximum allowable speed Smax is equal to the maximum value of the speed at which the second CPU can stop the vehicle V (e.g., the second CPU can slow down and stop the vehicle V at constant deceleration) within the second time T2, namely within the battery duration Tmax minus the first time T1, out of the speeds at the time the second CPU starts slowing down the vehicle V. In order to apply the vehicle electronic control device 1 configured as described above to the vehicle V, as large a space as possible is first secured in the vehicle V and an energy storage device that can be housed in this space is used as the second battery P2. The maximum allowable speed Smax for each state of the occupant is then defined according to the capacity of the second battery P2. For example, when the vehicle V is a small vehicle and the mounting space for the second battery P2 is relatively small and the battery duration Tmax is relatively short, relatively small values are assigned to the maximum allowable speed Smax for each state of the occupant. As described above, when the first controller 10 is unable to control the vehicle V, the second controller 20 can be powered by the small-capacity second battery P2 to slow down and stop the vehicle V. According to the present embodiment, since the small-capacity energy storage device can be used as the second battery P2, the parts cost of the vehicle V can be reduced. In other words, the vehicle electronic control device 1 is also applicable to small vehicles. That is, the vehicle electronic control device 1 is highly versatile.

Modifications

The present disclosure is not limited to the above embodiment, and various modifications can be made within the scope of the present disclosure.

First Modification

For example, the database D1 may be editable by the user (occupant). Specifically, when the user increases the maximum allowable speed Smax for a certain state X in the database D1, the second CPU reduces the first time T1 for this state X in the database D2 according to the amount of increase in maximum allowable speed Smax. The database D2 may be editable by the user. Specifically, when the user increases the first time T1 for a certain state X in the database D2, the first CPU reduces the maximum allowable speed Smax for this state X in the database D1 according to the amount of increase in first time T1. With this configuration, the control manner of the autonomous driving of the vehicle V by the first CPU and the second CPU can be changed according to the user's preference. The embodiment of the technique of the present disclosure is described above. However, the present disclosure is not limited to the vehicle electronic control device, but may be a method that is performed by the vehicle electronic control device and a computer-readable non-transitory storage medium storing instructions that cause a computer to perform functions of the vehicle electronic control device.

What is claimed is:

1. A vehicle electronic control device, comprising:
a detection device configured to detect a state of an occupant sitting in a seat where the occupant operates a driving operator of a vehicle;
a first control device configured to
be powered by a first battery mounted on the vehicle,
refer to a database that defines in advance a relationship between the state of the occupant and a maximum allowable speed of the vehicle,
identify the maximum allowable speed of the vehicle that corresponds to the state of the occupant, the state of the occupant being detected by the detection device, and
autonomously drive the vehicle at speeds equal to or lower than the identified maximum allowable speed; and
a second control device configured to
be powered by a second battery mounted on the vehicle,
refer to a database that defines in advance a relationship between the state of the occupant and a first time, the first time being a time period required from when information for causing the occupant to start manual driving by operating the driving operator is presented until the occupant starts the manual driving, and the database that defines in advance the relationship between the state of the occupant and the first time being set in such a manner that the maximum allowable speed corresponding to a second state of the occupant is lower than the maximum allowable speed corresponding to a first state of the occupant when the first time corresponding to the second state is longer than the first time corresponding to the first state,
identify the first time corresponding to the detected state of the occupant,
start presenting the information to the occupant of the vehicle at a switching time that is a time at which the first control device becomes unable to control the vehicle,
autonomously drive the vehicle from the switching time at speeds equal to or lower than the maximum allowable speed at the switching time, the maximum allowable speed being such a speed that the vehicle is able to be stopped within a second time by slowing down the vehicle at deceleration whose absolute value is smaller than a predetermined value, the second time being battery duration minus the first time, and the battery duration being a time period from when the second battery is in a fully charged state until the second battery is no longer able to continue to operate the second control device without being charged, and
stop the vehicle when the occupant does not start the manual driving during a period from the switching time until the identified first time elapses.

2. The vehicle electronic control device according to claim 1, wherein:
the detection device includes a first detection device and a second detection device;
the first control device is configured to identify the maximum allowable speed of the vehicle that corresponds to the state of the occupant, the state of the occupant being detected by the first detection device; and the second control device is configured to identify the first time corresponding to the state of the occupant detected by the second detection device.

3. A vehicle electronic control method applied to a vehicle electronic control device including a detection device, a first control device configured to be powered by a first battery mounted on a vehicle, and a second control device configured to be powered by a second battery mounted on the vehicle, the vehicle electronic control method comprising:
  detecting by the detection device a state of an occupant sitting in a seat where the occupant operates a driving operator of the vehicle;
  referring to a database that defines in advance a relationship between the state of the occupant and a maximum allowable speed of the vehicle by the first control device;
  identifying by the first control device the maximum allowable speed of the vehicle that corresponds to the state of the occupant, the state of the occupant being detected by the detection device;
  autonomously driving the vehicle at speeds equal to or lower than the identified maximum allowable speed by the first control device;
  referring to a database that defines in advance a relationship between the state of the occupant and a first time by the second control device, the first time being a time period required from when information for causing the occupant to start manual driving by operating the driving operator is presented until the occupant starts the manual driving, and the database that defines in advance the relationship between the state of the occupant and the first time being set in such a manner that the maximum allowable speed corresponding to a second state of the occupant is lower than the maximum allowable speed corresponding to a first state of the occupant when the first time corresponding to the second state is longer than the first time corresponding to the first state;
  identifying the first time corresponding to the detected state of the occupant by the second control device;
  starting presenting the information to the occupant of the vehicle at a switching time that is a time at which the first control device becomes unable to control the vehicle by the second control device;
  autonomously driving the vehicle from the switching time at speeds equal to or lower than the maximum allowable speed at the switching time by the second control device, the maximum allowable speed being such a speed that the vehicle is able to be stopped within a second time by slowing down the vehicle at deceleration whose absolute value is smaller than a predetermined value, the second time being battery duration minus the first time, and the battery duration being a time period from when the second battery is in a fully charged state until the second battery is no longer able to continue to operate the second control device without being charged; and
  stopping the vehicle by the second control device when the occupant does not start the manual driving during a period from the switching time until the identified first time elapses.

4. A non-transitory storage medium storing instructions that are executable by one or more processors and that cause the one or more processors to perform functions of a vehicle electronic control device, the vehicle electronic control device including a detection device, a first control device configured to be powered by a first battery mounted on a vehicle, and a second control device configured to be powered by a second battery mounted on the vehicle, the functions comprising:
  detecting by the detection device a state of an occupant sitting in a seat where the occupant operates a driving operator of the vehicle;
  referring to a database that defines in advance a relationship between the state of the occupant and a maximum allowable speed of the vehicle by the first control device;
  identifying by the first control device the maximum allowable speed of the vehicle that corresponds to the state of the occupant, the state of the occupant being detected by the detection device;
  autonomously driving the vehicle at speeds equal to or lower than the identified maximum allowable speed by the first control device;
  referring to a database that defines in advance a relationship between the state of the occupant and a first time by the second control device, the first time being a time period required from when information for causing the occupant to start manual driving by operating the driving operator is presented until the occupant starts the manual driving, and the database that defines in advance the relationship between the state of the occupant and the first time being set in such a manner that the maximum allowable speed corresponding to a second state of the occupant is lower than the maximum allowable speed corresponding to a first state of the occupant when the first time corresponding to the second state is longer than the first time corresponding to a first state of the occupant;
  identifying the first time corresponding to the detected state of the occupant by the second control device;
  starting presenting the information to the occupant of the vehicle at a switching time that is a time at which the first control device becomes unable to control the vehicle by the second control device;
  autonomously driving the vehicle from the switching time at speeds equal to or lower than the maximum allowable speed at the switching time by the second control device, the maximum allowable speed being such a speed that the vehicle is able to be stopped within a second time by slowing down the vehicle at deceleration whose absolute value is smaller than a predetermined value, the second time being battery duration minus the first time, and the battery duration being a time period from when the second battery is in a fully charged state until the second battery is no longer able to continue to operate the second control device without being charged; and
  stopping the vehicle by the second control device when the occupant does not start the manual driving during a period from the switching time until the identified first time elapses.

* * * * *